United States Patent [19]

Di Geronimo

[11] Patent Number: 5,514,722

[45] Date of Patent: May 7, 1996

[54] SHOCK ABSORBINGG UNDERLAYMENT FOR ARTIFICIAL PLAYING SURFACES

[75] Inventor: Joseph W. Di Geronimo, Sturbridge, Mass.

[73] Assignee: Presidential Sports Systems, Inc., Lubbock, Tex.

[21] Appl. No.: 289,764

[22] Filed: Aug. 12, 1994

[51] Int. Cl.$^6$ .............................. C08J 11/04; C08K 3/24; C08L 9/00; E01C 5/18

[52] U.S. Cl. ................. 521/42; 404/32; 521/82; 521/85; 521/89; 521/91; 521/94; 521/106; 521/119; 521/120; 521/122; 521/128; 521/137; 521/140; 521/155; 521/159; 521/163; 521/168; 524/401; 524/417; 524/422; 524/429; 524/442; 524/450; 524/507; 524/700; 524/706; 524/789; 524/791; 524/796; 524/871; 525/123; 525/130

[58] Field of Search ................................ 521/42, 82, 85, 521/89, 91, 94, 106, 119, 120, 122, 128, 137, 140, 155, 159, 163, 168; 524/417, 422, 429, 401, 450, 442, 507, 700, 706, 789, 791, 796, 871; 525/123, 130; 404/32

[56] References Cited

U.S. PATENT DOCUMENTS 3,801,421 4/1974 Allen et al. ........................... 404/32
4,073,753 2/1978 Hauge ................................... 404/32
4,112,176 9/1978 Bailey .................................. 428/304
4,337,283 6/1982 Haas, Jr. ............................... 428/331

*Primary Examiner*—James J. Seidleck
*Assistant Examiner*—Rabon Sergent
*Attorney, Agent, or Firm*—Hitt Chwang & Gaines

[57] ABSTRACT

The present invention is directed to an underlayment composition for an artificial playing surface comprised of a butadiene rubber, such as polybutadiene or styrene-butadiene that is commercially available as recycled polycord tires that have been granulized. An inorganic-base moisture-retaining agent such as vermiculite or perlite is also included in the composition in addition to a binder comprised of a mixture of isocyanate polyurethane and an inorganic acid. The present invention also provides a method of making the present composition. The method comprises the steps of mixing thoroughly granulized particles of butadiene rubber in a mixing container, mixing an inorganic-based moisture-retaining component with the butadiene rubber, mixing an acid having a pH≦3 with the butadiene rubber and the inorganic-based moisture-retaining component, and mixing an isocyanate polyurethane with the butadiene rubber, the inorganic-based moisture-retaining component and the acid. Finally, the present invention also provides a method of using the present composition which comprises the steps of applying the composition over a conventional foundation base and laying an artificial turf over the underlayment composition.

41 Claims, 2 Drawing Sheets

5,514,722

SHOCK ABSORBINGG UNDERLAYMENT FOR ARTIFICIAL PLAYING SURFACES

TECHNICAL FIELD OF THE INVENTION

The present invention is directed to an underlayment for artificial playing surfaces, and more particularly is directed to an underlayment having moisture retaining and high shock-absorbing capabilities.

BACKGROUND OF THE INVENTION

Games and various sports activities have been a part of civilization for most of recorded time and have, in fact, grown dramatically in popularity in the United States and around the world over the last century. Many types of playing surfaces have been developed to provide a suitable surface on which to conduct these various sports activities.

One of the first of such playing surfaces was a natural grass surface. Grass fields offer several advantages for conducting different types of games and related activities. For instance, natural grass fields provide an excellent shock-absorbing cushion for athletes as they run, jump and dive their way to victory over their opponents. This is an important aspect of any playing surface, since it is well known that the athlete's bones, joints and body, in general, absorb a great deal of shock force when impacting the playing surface while performing various athletic maneuvers. Maximum absorption of shock forces helps to reduce injuries that may arise when the athlete's body is subjected to shock forces over time.

Another advantage grass fields offer is that they provide excellent traction in dry weather conditions, allowing the athlete to keep proper balance and thereby more properly execute athletic maneuvers.

A further advantage grass fields offer is that they contain moisture in their grass root systems. The moisture functions in two ways. First, the moisture acts as a natural heat dissipator that, in turn, provides a relatively cool surface on which to perform the physically demanding activities. Second, the moisture functions as a lubricant to provide an appropriate amount of friction co-efficient reduction to prevent "footlock" —a situation that arises when the athlete's shoe momentarily sticks or drags on the turf, sometimes causing the athlete to stumble or fall. This second function also helps to prevent immediate injuries, because, when the athlete is hit by another player, the moisture in the grass surface allows the athlete's foot to slide across the surface instead of sticking to the surface. This lubricating action greatly reduces the chance of injury to the legs, and particularly to the knees or ankles. Additionally, natural grass fields absorb and drain water to an acceptable degree.

To this point, the discussion has been directed primarily to applications of grass fields in playing sports such as baseball, football, soccer or other outdoors sports that require a playing field. In addition to these applications, however, grass turf is also applicable in a golf course setting. The reason is that the various grass turfs customarily found on golf courses offer an ideal playing surface. For instance, the moisture content of the greens gives the right amount of ball stopping control as a ball is hit onto the green. Also, putting is affected by the amount of moisture available in the turf. Additionally, the impact absorption capability is a significant factor in properly stopping an in-flight ball on the green. While grass fields and turfs have several advantages and applications, there are, unfortunately, certain disadvantages associated with grass fields and turf.

One such disadvantage is that grass fields, of course, become very muddy and slippery when exposed to large amounts of water in a short period of time and, when excessively wet, they can be torn up rather quickly. Another disadvantage is that many of today's sports arenas are domed and enclosed for year round comfort of the spectators and the athletes alike. As such, natural grass fields are less desirable in these enclosed areas because of inadequate exposure to sunlight. Still another disadvantage is that grass fields require constant watering, fertilizing and general maintenance to keep them in an ideal playing condition. This upkeep is very expensive in that it requires substantial amounts of time and money for maintenance crews and supplies.

With respect to applications involving golf courses, the natural grass turf also has the same disadvantages regarding upkeep and general maintenance with even more cost and time involved. For example, tee boxes undergo regular abuse as successive golfers make divots in the surface of the turf while teeing-off from the box. The boxes, therefore, require constant replacement of sod and turf and, in some cases, require the provision of more than one tee box for each hole. Another example is the damage that occurs to greens when the balls impact the green and the physical damage that is often done by golfers and harsh weather conditions. Finally, grass and especially green grass can be very susceptible to frost damage, fungus and various other types of environmental conditions.

Another type of artificial turf that has been extensively used over the last two decades is "ASTRO TURF®", which is comprised of strands of extruded plastic. The "ASTRO TURF®" is laid over a shock absorbing underlayment and a foundational hard base. Other types of artificial turfs include loop-pile carpet-like turfs, knitted nylon or polypropylene turfs or polypropylene tufted turfs.

The foundational hard base conventionally consists of a stone material that may vary in depth, depending on the intended use. The hard base is normally formed by depositing the stone material in a layer of at least of six inches deep to a tolerance of plus or minus one inch and sloped in a predetermined direction for water drainage. The layer is then compacted, watered for optimum moisture content, and rolled to a compaction rate of 95% standard procter density. The compacted stone material is then normally oiled with a primer of hot, liquid asphalt to seal the material and provide bonding for subsequent deposition of an asphalt layer on top. Next, hot-mix asphalt is laid in place by conventional paving equipment. On top of this asphalt is laid a conventional underlayment or shock pad over which the artificial turf is laid.

Conventional underlayment shock pads typically consist of a hardened mixture of rubber granules and either a polyurethane, polyethylene or polyvinyl chloride binder in combination with a small pebble or stone approximately 4 to 9 mm in diameter. The conventional mixture forms what is known as a "closed cell" system, where multitudes of noncontiguous air pockets are trapped in the mixture. These pads average ⅝ inches in thickness when laid over the hard base asphalt. While the combination of the artificial turf and the underlying shock pad overcome some of the disadvantages associated with the natural grass field or turf, they introduce, however, several other disadvantages.

One such disadvantage is that many of the conventional shock pads are closed-cell systems. Again, a closed cell system is one in which the cells within the pad structure are not interconnected with one another or the surface of the pad. As such, the pad cannot "breathe", i.e, water and air cannot move into and out of the pad. In fact, the typical closed-cell system pad is specifically designed to repel moisture to enhance the water shedding capabilities of the playing surface in general. Thus, the pad neither retains moisture nor allows moisture to pass therethrough. This is a significant disadvantage because there is no moisture present to act as a natural lubricant, thereby preventing footlock, or to act as a natural heat dissipator, thereby providing a cooler playing surface.

Another disadvantage of the closed-cell system is that the closed-cell pads collapse over time, increasing the shock to the athlete, in turn transmitting greater shock to the athlete's body upon impact. Furthermore, the pads are initially limited in shock absorption, especially from greater heights, which, of course, increases the amount of force that the athlete's body absorbs when it impacts the surface.

Still another disadvantage of the prior art shock pads is that they use a polyurethane foam that causes the pad to be too rigid and hard. This rigidity and hardness detracts further still from the pad's ability to absorb the appropriate amount of impact shock. In addition, pebbles or stones are usually incorporated making the pad even harder still and thus even less capable of absorbing the appropriate amount of impact shock.

While some open-celled systems do exist, they also suffer from disadvantages. For example, as with closed-celled systems, open-celled systems typically include pebbles or stones and polyurethane foams in the mixture. As previously stated, polyurethane foams cause the pad to become hard and less absorbent over time. In addition, moisture cannot be entrained or entrapped within the pad because the pads are typically designed to allow water to pass through them to drain water effectively from the playing surface. Thus, footlock and a high playing field temperature are also prevalent in these conventional open-celled systems as well.

Applications of the conventional underlayments discussed above with respect to golf courses are unsatisfactory for basically the same reasons. First, the base or shock pad does not contain enough moisture to effectively simulate a natural grass green regarding its ability to stop an in-flight ball landing on the green. Moreover, the pad lacks the required degree of energy absorption that is necessary to properly stop the ball and that is necessary for absorbing the impact of the golf club as the golfer hits the tee shot from the tee box.

Accordingly, what is needed in the art is a shock absorbing underlayment that is durable, absorbs shock in the manner of a natural grass field and retains moisture to lubricate the surface of the artificial turf to prevent footlock and provide a playing surface that is cooler. The shock pad of the present invention addresses these needs.

SUMMARY OF THE INVENTION

To address the above-discussed deficiencies of the prior art, it is a primary object of the present invention to provide an underlayment that is durable and that in combination with an overlaying turf has the desirable qualities of natural grass. In the attainment of the above-described primary object, the present invention provides in a shock absorbing underlayment composition comprising a butadiene rubber that comprises from about 90% to about 85% by weight of the composition, an inorganic based moisture-retaining component that comprises from about 3% to about 1% by weight of the composition, and a binder mixture obtained by mixing an isocyanate polyurethane that comprises from about 10% to about 8% by weight of the composition and an acid that comprises from about 1.6% to about 0.2% of the composition wherein the mixture comprises from about 12% to about 8% by weight of the composition. Preferably the butadiene rubber comprises from about 88% to about 86% by weight of the composition, and more preferably comprises about 86% by weight of the composition.

In another aspect of the preferred embodiment, the butadiene rubber is selected from the group consisting of polybutadiene rubber and styrene-butadiene rubber. Preferably, the butadiene rubber is comprised of granulized polycord tires having a shore A ranging from about 40 to about 70 with the granules preferably range in size from about 6 millimeters to about 2 millimeters in diameter and with the polycord selected from the group consisting of nylon and polyester. More preferably, however, the shore ranges from about 45 to about 65 and most preferably ranges from about 50 to about 60.

The inorganic-based moisture-retaining component of the present composition preferably comprises from about 2% to about 1% by weight of the composition and in a more preferred embodiment, the inorganic-based moisture-retaining component comprises about 2% by weight of the composition. The inorganic-based moisture-retaining component is selected preferably from the group consisting of hydrated aluminum silicate and volcanic glass. The hydrated aluminum silicate is preferably vermiculite and the volcanic glass is preferably perlite.

The binder mixture preferably comprises from about 12% to about 9% by weight of the composition and more preferably comprises about 12% by weight of the composition. The isocyanate polyurethane component of the binder mixture is preferably a methylene di-p-phenylene isocyanate polyurethane while the acid is preferably an inorganic acid selected from the group consisting of sulfuric, nitric, hydrochloric and phosphoric. More preferably, the inorganic acid is an acid mixture of a 20% concentration by weight of sulfuric acid and a 20% concentration by weight of hydrochloric acid in an aqueous medium, wherein the acid mixture has a pH$\leq$3.

The various components of the present composition combine to form an underlayment that preferably has an open-celled structure and a shock absorbency factor from a drop height of 24 inches ranging from about 85 gs to about 90 gs, a shock absorbency factor from a drop height of 36 inches ranging from about 120 gs to about 125 gs, a shock absorbency factor from a drop height of 48 inches ranging from about 180 gs to about 200 gs, and a shock absorbency factor from a drop height of 96 inches ranging from about 275 gs. to about 300 gs.

In another aspect of the present invention, in a preferred embodiment thereof, there is provided a process for making a shock absorbing underlayment composition comprising the steps of: a) mixing thoroughly granulized particles of butadiene rubber in a mixing container with the butadiene rubber comprising from about 90% to about 85% by weight of the composition, b) mixing an inorganic-based moisture-retaining component with the butadiene rubber with the inorganic-based moisture-retaining component comprising from about 3% to About 1% by weight of the composition, c) mixing an acid having a pH$\leq$3 with the butadiene rubber and the inorganic-based moisture-retaining component with the acid comprising from about 1.6% to about 0.2% by weight of the composition, and d) mixing a isocyanate polyurethane with the butadiene rubber, the inorganic-based moisture-retaining component and the acid with the isocyanate polyurethane comprising from about 10% to about 8% by weight of the composition, with the underlayment preferably having an open-celled structure.

Preferably, the butadiene rubber is selected from the group consisting of polybutadiene rubber and styrene-butadiene rubber and is comprised of granulized polycord tires having a shore A ranging from about 40 to about 70, and more preferably having a shore A ranging from about 50 to about 65. The polycord is preferably selected from the group consisting of nylon and polyester and the polycord tires are granulized to a size ranging from about 6 millimeters to about 2 millimeters in diameter.

The inorganic-based moisture-retaining component is preferably selected from the group consisting of hydrated aluminum silicate and volcanic glass. The hydrated aluminum silicate is preferably vermiculite and the volcanic glass is preferably perlite.

The isocyanate polyurethane of the present composition is preferably a methylene di-p-phenylene isocyanate polyurethane while the acid is preferably an inorganic acid selected from the group consisting of sulfuric, nitric, hydrochloric and phosphoric. More preferably, the inorganic acid is an acid mixture of a 20% concentration by weight of sulfuric acid and a 20% concentration by weight of hydrochloric acid in an aqueous medium.

In yet another aspect of the present invention, there is provided a method of using the shock absorbing underlayment composition comprising the steps of: a) making the composition in a mixing container with the composition comprising: butadiene rubber comprising from about 90% to about 85% by weight of the composition, an inorganic-based moisture-retaining component comprising from about 3% to about 1% by weight of the composition, and a binder mixture obtained by mixing a isocyanate polyurethane comprising from about 10% to about 8% by weight of the composition and an acid comprising from about 1.6% to about 0.2% of the composition wherein the mixture comprises from about 12% to about 8% by weight of the composition with the composition having an open-celled structure, thereby allowing water to substantially drain therethrough, b) uniformly applying the composition to a foundational substrate surface in a thickness ranging from about 19 mm to about 102 mm and c) trowelling the composition to a substantially level, smooth finished surface.

The butadiene rubber is preferably comprised of granulized polycord tire having a shore A ranging from about 40 to about 70 and having a size ranging from about 6 millimeters to about 2 millimeters in diameter, the butadiene rubber selected from the group consisting of polybutadiene rubber and sytrene-butadiene rubber. The inorganic-based moisture-retaining component is preferably selected from the group consisting of vermiculite and perlite. The isocyanate polyurethane is preferably methylene di-p-phenylene isocyanate polyurethane while the acid is an inorganic acid mixture of 20% concentration by weight of sulfuric acid and 20% concentration of hydrochloric acid in an aqueous medium having a pH≦3.

In another aspect of the present invention, the method of using further comprises the steps of forming a foundational substrate surface, the steps comprising: a). uniformly forming a compacted sub-grade base layer having a minimum thickness of about 154 mm, b). uniformly forming a compacted substantially level intermediate layer over the sub-grade base layer having a minimum thickness ranging from about 26 mm to about 38 mm, and uniformly laying a first porous pad over the intermediate layer. The sub-grade base layer may be formed from stone sub-base material. The step of forming the sub-grade base may also include positioning drain pipe in the sub-grade base and sculpting the sub-grade base to drain water to the drain pipe and applying a first porous pad over the sub-grade base material.

In yet another aspect of the method of using, the method may further comprise the steps of uniformly applying hot liquid asphalt over the stone sub-base material and uniformly applying a hot-mix asphalt as the intermediate layer over the stone sub-base material. In yet another embodiment, the intermediate layer may be comprised of a stone material. A second porous pad may be applied over the intermediate layer if so desired.

The method using may also include the step of uniformly laying an artificial turf over the composition surface where the artificial turf may be an extruded plastic fiber turf, a knitted nylon, a knitted polypropylene or a tufted polypropylene.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
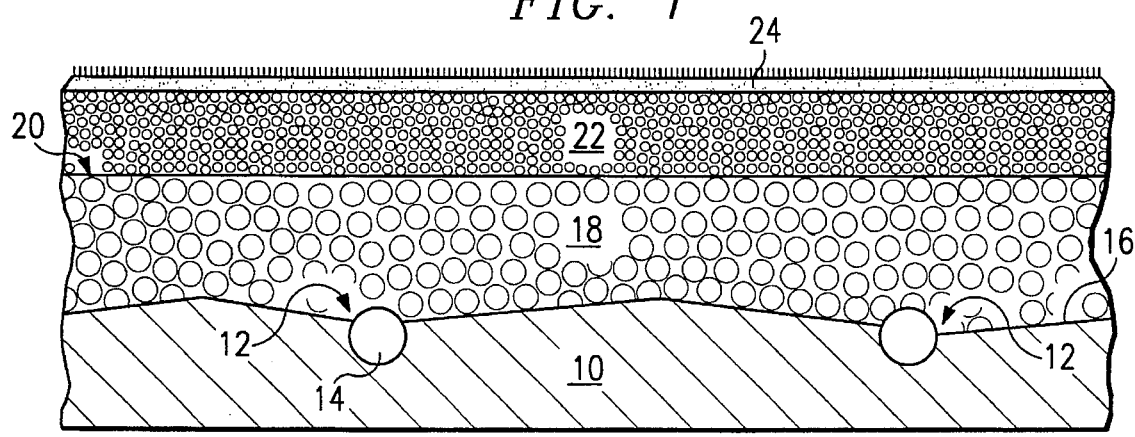
FIG. 1 illustrates a cross-sectional view of an artificial playing surface system with a drainage system placed therein.

The underlayment composition of the present invention provides a unique shock absorbing, moisture-retaining underlayment that provides many advantages commonly associated with natural grass turf. The present composition permits air and moisture to enter and exit the underlayment, which provides for both grass-like traction and a cooler playing surface. At the same time, however, the underlayment permits substantial amounts of water to drain through the pad, thereby allowing proper drainage to occur. Additionally, the present composition provides an open-celled structure that has the desired degree of soft-hardness ratio and resiliency to adequately absorb shock in a more efficient manner than conventional underlayments. These characteristics make the underlayment well suited for artificial playing surfaces, such as "ASTRO TURF®" and other carpeted playing surfaces, especially where grass-like shock absorbance, traction and general playing conditions are desired.

In the broadest scope, the underlayment composition of the present invention is comprised of synthetic rubber, an inorganic-based moisture-retaining component and a binder mixture obtained by mixing an isocyanate polyurethane and an acid. This unique combination yields an underlayment with several unexpected results as discussed in detail, below.

In a preferred embodiment, the synthetic rubber may be a butadiene rubber comprising from about 90% to about 85% by weight of the composition. More preferably, the butadiene rubber is polybutadiene or styrene-butadiene rubber that preferably comprises from about 88% to about 86% by weight of the composition. Most preferably, however, the butadiene rubber is a styrene-butadiene that comprises about 86% by weight of the composition. The synthetic rubber is preferably granulized with the granules having a diameter that allows for maximum sized air voids while giving the desired degree of softness-hardness and strength. Preferably, the granules' size range from about 6 millimeters to about 2 millimeters in diameter. A preferable source for the granulized synthetic rubber is recycled tires that are commercially available from numerous sources, such as American Recycled Tires, Midland, Mich.; TLJ, Inc., St. Louis, Mo.; W & W Recycling Rubber, Saugus, Mass. and Tire Incorporated, Charlotte, N.C. The granulized rubber is preferably comprised of granulized reinforced polycord tires with no steel present and with the polycord being comprised of nylon or polyester.

To provide an underlayment with the desirable amount of shock absorbency and traction, it is preferred that the synthetic rubber have a certain degree of softness-hardness and resiliency. To that end, it is preferable that the recycled tires have a shore "A" of about 40 to about 70 as measured by the American Standard Test and Measurements ("ASTM") scale for tire hardness, ASTM No. D2240-68. This shore gives the granulized rubber the desired amount of softness-hardness and resiliency required in most applications. More preferably, however, the tires have a shore A of about 45 to about 65, and most preferably, have a shore A of about 50 to about 60. Of course, it will be appreciated that the shore may range several units higher or lower than the range just stated, depending on the performance requirements desired for the underlayment surface as applied to various applications.

The inorganic-based moisture-retaining agent gives the underlayment composition important properties that set it apart from conventional underlayments. For instance, typical underlayments do not use moisture-retaining agents because the conventional thought with respect to artificial playing surfaces has been that water hinders traction and should be removed. Thus, reflected in the prior art has been an emphasis to purposefully design the underlayment to shed as much water as possible. As a result, conventional underlayments cannot simulate natural grass because they lack the essential amount of moisture. As stated in the Background, moisture is a necessary component to prevent footlock and provide a cooler playing surface.

In contrast, however, the underlayment composition of the present invention includes an inorganic-based moisture-retaining agent, which allows it to retain moisture. As used herein, the term "moisture-retaining agent" means an agent that can both retain and release moisture or water. In other words, the moisture or water does not become permanently entrapped within the composition, but is allowed to evaporate and be replaced. Thus, the moisture-retaining agent in the underlayment composition, in effect, reduces the coefficient of friction by acting as a moisture reservoir continuously releasing moisture to the overlaying artificial turf, thereby reducing potentially injuring footlock. Additionally, the moisture-retaining agent acts as an cooling agent by the process of heat dissipation through water evaporation to provide a cooler playing surface. As such, the underlayment of the present invention closely simulates preferred natural grass-like conditions.

The inorganic-based moisture-retaining agent of the present invention is preferably a hydrated aluminum silicate, including organopolysilicates, or volcanic glass and comprises from about 3% to about 1% by weight of the composition and more preferably comprises from about 2% to about 1% by weight of the composition. The hydrated aluminum silicate is preferably a three-layered phyllosilicate comprised of a trioctahedral with brucite-type layers or a dioctahedral with gibbsite-type layers having water retention and releasing properties. More preferably, however, the hydrated aluminum silicate is vermiculite or montmorillonite. The volcanic glass is preferably a commercially-available processed perlite that has been heated until expanded to a frothy product. The effects of the presence of the inorganic-based moisture agent are reflected in TABLE II, below and are discussed below in more detail in the Experimental Results section.

The next component of the present composition invention is a mixture obtained by mixing an isocyanate polyurethane and an acid. Preferably the ioscyanate polyurethane comprises from about 10% to about 8% by weight of the composition and more preferably from about 9% to about 10% by weight of the composition. The isocyanate polyurethane is preferably a methylene di-p-phenylene isocyanate polyurethane that is a pigmented liquid with a boiling point of 392° F., an evaporation rate less than 1 (butyl ether=1), a vapor density greater than 1 (air=1), and a specific gravity of 1.10. An example of an isocyanate polyurethane that is commercially available is "FUTURA-TECH 8805", Product No. 08805500 manufactured by Futura Coatings, Inc., 9200 Latty Ave., Hazelwood, Mo. 63042 in which a polyisocyanate comprises from about 79% to about 95% by weight of the polyurethane composition that has a vapor pressure of less than 0.1 mm Hg at 25° C. and a vapor density of 8.6 and a cyclic ester that comprises from about 0% to about 8% by weight of the polyurethane composition.

The isocyanate polyurethane is mixed with an acid, preferably in the manner as described below. The acid preferably comprises from about 0.2% to about 1.6% by weight of the underlayment composition and more preferably comprises from about 0.2% to about 1.0% by weight of the composition. The acid is preferably an inorganic acid selected from the group of hydrochloric acid, sulfuric acid, nitric acid or phosphoric acid, and more preferably, is an aqueous mixture of equal amounts of 20% concentrated by weight hydrochloric acid and 20% concentrated by weight sulfuric acid having a pH$\leq$3. The combination of the isocyanate polyurethane and the acid foams the polyurethane and reduces stand rigidity and reduces the polyurethanes natural stiffness. It is believed that the reaction of the various components adds tremendous amounts of air entrainment to the polyurethane (up to 28% air voids) and forms an open-celled structure within the underlayment, which adds shock absorbency. Thus, the combination yields the unexpected result of an underlayment having a polyurethane component that is less rigid and more resilient than conventional formulations, thereby causing the underlayment to have a greater shock absorbing capacity than conventional formulations. The shock absorbency advantages offered by the unique present invention are discussed and illustrated below in more detail in the Experimental Results section.

A preferred embodiment of the present composition is made in the following manner:

Place approximately 100 pounds of recycled granulized nylon or polyester cord tire rubber with the granules ranging in size from about 6 mm to about 2 mm in diameter into an empty paddle mixer container while the mixer is running. The rubber granules should be mixed thoroughly for about two to three minutes or until the rubber is thoroughly broken into the individual granules. With the mixer still running, add approximately 1 pound each of commercially processed, dry vermiculite and perlite to the granulized rubber and mix the dry components until thoroughly mixed. To the dry mixture, add a total of 6 fluid ounces of an aqueous mixture comprised of equal volumetric amounts of 20% concentrated by weight hydrochloric acid and 20% concentrated by weight sulfuric acid as the mixture is continuously stirred. Next, slowly add approximately 13.75 pounds of polyisocyanate polyurethane on top of the rolling, or mixing composition, so as not to saturate any one area excessively. Then, mix the total mixture for no less than three minutes before emptying the mixer.

Normally, all materials are mixed thoroughly after the three minute time period. However, the operator should visually inspect the rolling mix to determine if the composition is thoroughly mixed after the three minute period. The mixture is then emptied from the container and spread on the foundational substrate. The mixture may be hand screeded by conventional methods onto the foundational surface or the mixture may be screeded by a conventional mechanical spreader. In either case, it is important to achieve a uniformly and substantially level surface having no divots, trowel marks, valleys or holes. What is meant by "substantially level" is that the surface may be uniformly slanted a few degrees, as is conventionally done, to achieve proper drainage from the playing surface. After the underlayment is trowelled to a smooth finish, the underlayment material is compressed to approximately twelve pounds per square foot. Of course, in applications involving golf courses, the underlayment and the foundational layers would be sculpted to conform to the desire topographical contours of the golf course.

As previously stated, the underlayment composition of the present invention is exceptionally well suited for applications directed to artificial playing surfaces such as football fields. Turning now to FIG. 1, there is illustrated a cross-sectional view of a playing surface utilizing the underlayment composition of the present invention as it relates primarily to new field or area construction having a drain-through system incorporated therein. A normal sub-grade 10 is compacted to 95% standard procter density and is sculpted to drain to a drainage channels 12 on twenty-five foot centers or as local geographical conditions demand. In the center of the drainage channels 12 is a perforated four, six, or eight inch diameter drain pipe 14 extending to header drains, not shown. The size of the pipe is dictated by the size of the area, as well as yearly rainfall totals in the locale. Laid over the sub-grade 10 is preferably a non-woven geotextile pad 16 or membrane known as a soil separator. Pad 16 allows water to percolate through it to the drainage channels 12 and keeps the base stone material 18 from washing into the drain lines and reducing the drainage flow. The non-woven geotextile is preferably made from recycled plastic bottles extruded into tiny fibers for the body of the fabric. The base stone material 18 is laid over the sub-grade material 10 and the pad 16 and compacted to 95% standard procter density. The thickness of the base course may vary from one geographical locale to another. A second non-woven geotextile pad 20 is uniformly laid over the base stone material 18 and is used as a soil separator and also used to separate the base stone materials from the shock absorbing underlayment 22. The weight of the second pad 20 is preferably in the range of between twelve and thirty ounces. The second pad 20 will actually be the backing that gives additional horizontal strength to the shock absorbing underlayment 22. The shock absorbing underlayment 22 is uniformly laid over the second pad 20 and the base stone material 18 in the manner previously described above to a preferable thickness ranging from about 25 mm to about 102 mm. It should be understood, however, that the thickness may vary beyond the stated ranges, depending on the use requirements of the underlayment. An artificial turf 24 is then uniformly laid over the shock absorbing underlayment. The artificial turf may be any conventional artificial surface covering, such as an extruded plastic "ASTRO TURF®" covering or knitted nylon or polypropylene or tufted polypropylene.

Figure 2:
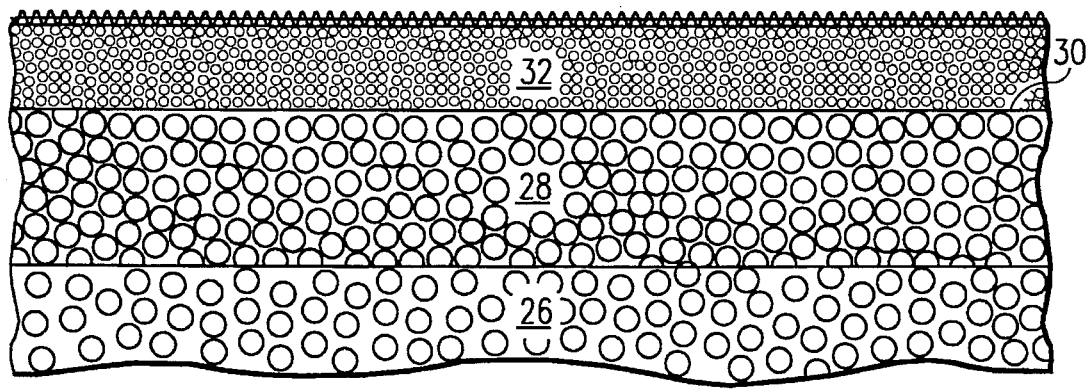
FIG. 2 illustrates a cross-sectional view of a another artificial playing surface system.

Turning now to FIG. 2, there is illustrated a cross-sectional view of a more conventional artificial surface and foundational base structure utilizing the underlayment composition of the present invention. A stone sub-base material 26 is initially laid down over a prepared foundational base, not shown. The sub-base 26 is normally a minimum of six inches in depth and shaped to a tolerance of plus or minus one inch and sloped in a direction a minimum of 0.83% or more. The sub-base 26 is then compacted, watered for optimum moisture content, and rolled to a compaction rate of 95% standard procter density. Next, the sub-base 26 is oiled with a primer of hot, liquid asphalt, similar to MC-30, for sealing and bonding. Next, a hot-mix asphalt layer 28 is laid in place by paving equipment to a thickness of at least 25 mm to 39 mm in thickness. However, this depth also may vary in different geographical locales. A non-woven geotextile pad 30 is laid over the asphalt layer 28 and a shock absorbing underlayment 32 of the present invention is then uniformly laid over the pad 30 at a thickness ranging from about 19 mm to about 102 mm. Again, it should be understood, however, that the thickness may vary beyond these stated ranges, depending on the use requirements of the underlayment. The pad 30 allows water to percolate through the underlayment 32 and drain off the field between the asphalt layer 28 and the pad 30. An artificial turf 34 is then uniformly laid over the underlayment 32.

EXPERIMENTAL RESULTS

Figure 3:
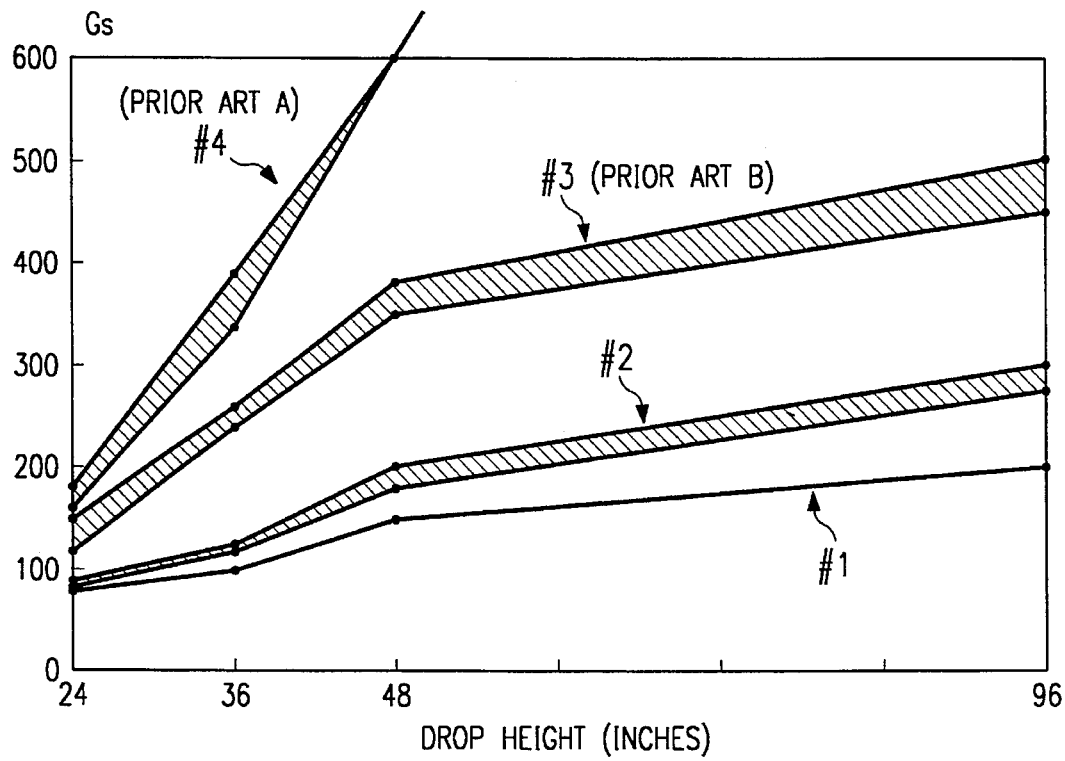
FIG. 3 illustrates a graph of impact curves for different prior art underlayments as compared to natural grass and the present underlayment composition.

Impact measurements were taken for two different prior art formulations along with the present invention underlayment composition and compared with impact measurements taken on natural grass turf. The impact readings were taken with a drop testing unit called a "G-MAX" unit, and the impact forces were measured in gs. The results of these readings are illustrated in FIG. 3, which is a graph of the impact curves for different turf underlayment types with the y-axis representing acceleration, measured in gs and the x-axis representing the drop height taken at 24 inches, 36 inches, 48 inches and 96 inches. Two measurements were taken for each turf type and the range between the two readings is represented by the hatched-in area in FIG. 3. The results illustrated in FIG. 3 are a comparison of grass, designated #1, the present composition, designated #2, Prior Art "B" which is a rubber-stone, polyurethane-based system, designated #3 and Prior Art "A" which is a polyvinyl chloride-based closed-cell system, designated #4.

As seen from FIG. 3, the present composition more closely simulates the shock absorbency of natural grass, particularly at a drop height ranging from 24 inches to 48 inches and is only 100 gs higher at the height of 96 inches. In stark contrast, however, the prior art underlayment compositions show a substantially higher impact force from the same drop height than the present composition. Thus, it is seen from FIG. 3 that the underlayment of the present composition has shock absorbency properties that are far superior to the prior art formulations and more closely simulates the shock absorbency of natural grass.

Two different impact measurements were also taken for different formulations, including a prior art formulation and the underlayment composition of the present invention and compared with impact measurements taken for natural grass turf. The impact readings were taken with same drop testing unit note above. The averages of these results are shown in TABLE I and graphically illustrated in FIG. 4, with the y-axis representing acceleration, measured in gs and the x-axis representing the drop height taken at 24 inches, 36 inches, 48 inches and 96 inches.

TABLE I

| FORCE IN gs | 24 inches | 36 inches | 48 inches | 96 inches |
| --- | --- | --- | --- | --- |
| 1. GRASS | 80 | 100 | 150 | 200 |
| 2. 10% PU 6 oz. acid 2% vermic. 88% SBR | 87.5 | 122.5 | 190 | 287.5 |
| 3. 6% PU 14% stone 80% SBR | 135 | 250 | 365 | 475 |
| 4. 10% PU 0% acid 0% vermic. 90% SBR | 132.5 | 200 | 325 | 425 |
| 5. 7% PU 0% acid 0% vermic. 93% SBR | 102.5 | 115 | 185 | 275 |
| 6. 12% PU 0% acid 0% vermic. 88% SBR | 150 | 285 | 385 | 500 |

Figure 4:
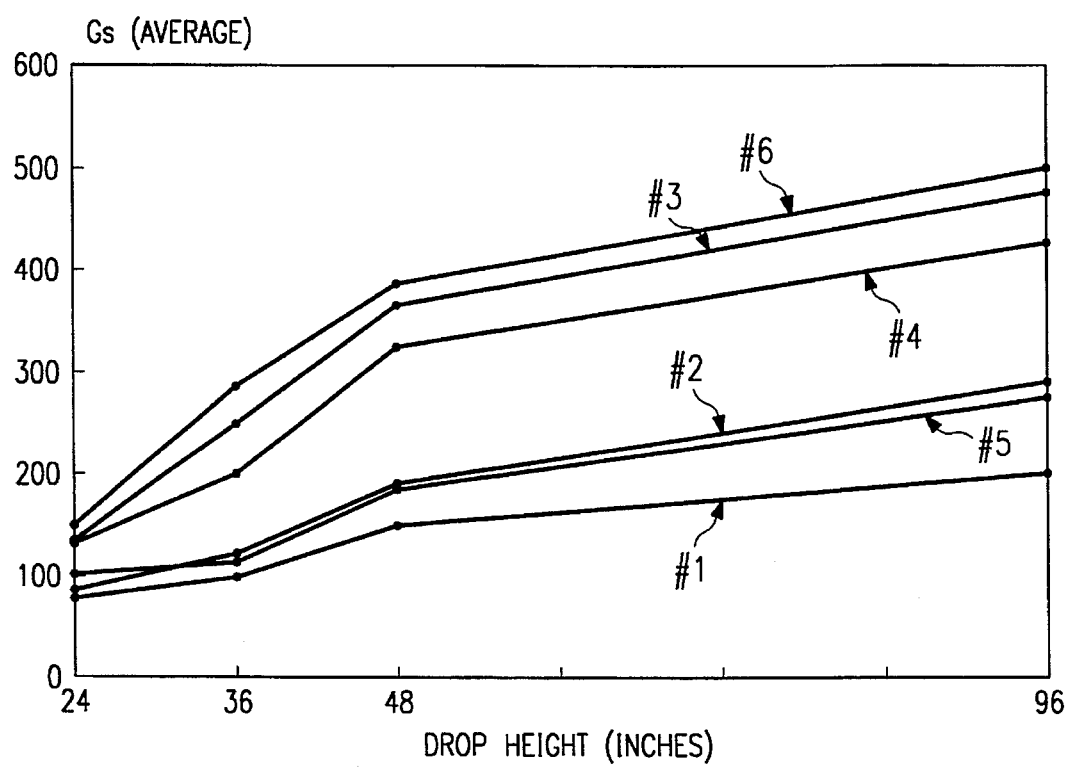
FIG. 4 illustrates a graph of impact curves for various underlayment formulations as compared to natural grass and the present underlayment composition.

The results of TABLE I as illustrated in FIG. 4 are a comparison of grass, designated #1, the present composition, designated #2, Prior Art formulation comprised of 6% polyurethane ("PU"), 14% stone and 80% styrene-butadiene rubber ("SBR"), designated #3, a first contrasting formulation comprised of 10% polyurethane, 0% acid, 0% vermiculite and 90% styrene-butadiene rubber, designated #4, a second contrasting formulation comprised of 7% polyurethane, 0% acid, 0% vermiculite and 93% styrenebutadiene rubber, designated #5 and a third contrasting formulation comprising 12% polyurethane, 0% acid, 0% vermiculite and 88% styrene-butadiene rubber, designated #6.

As seen from TABLE I and FIG. 4, there is a distinct contrast between the forces absorbed between the composition of the present invention and the prior art and contrasting formulas. The only exception is formulation #5, which somewhat parallels the results obtained for the present composition. However, this formulation is not acceptable because (1) the material easily unravels and (2) it is too soft, possibly giving rise to injury by an athlete catching his foot on the playing surface. Furthermore, this particular formulation lacks the essential moisture-retaining agent, vermiculite. The other formulations, including the prior art clearly show that the composition of the present invention has far superior shock absorbing impact properties.

In addition to the impact tests that were conducted, moisture retention tests were also conducted on two different prior art formulations and the present invention underlayment composition as compared to the moisture capabilities of natural grass. The following results are based on a comparison of grass, the present composition (PC) Prior Art "A" which is a polyvinyl chloride-based closed-cell system without a moisture-retaining agent and Prior Art "B" which is a rubber-stone, polyurethane-based system without a moisture-retaining agent. The comparison was based on a 2 inch rainfall/hour at a temperature of 80 degrees and a controlled humidity of 50%. The results of this comparison are reported in TABLE II, below.

TABLE II

| CONDITIONS | GRASS | PC | PRIOR ART "A" | PRIOR ART "B" |
| --- | --- | --- | --- | --- |
| Dry Weight Sample 1 sq. yd. | 125 lbs. | 60 lbs. | 8 lbs. | 63 lbs. |
| Moisture Retention After 1 hr. | 75% | 25% | 0% | 4% |
| Moisture Retention After 24 hrs. | 22% | 10% | 0% | 0% |
| Air Voids for Breathable Base | 25% | 30% | 0% | 20% |

As seen from TABLE II, after a period of 24 hours, the underlayment of the present invention still has a 10% moisture retention whereas the Prior Art "A" and "B" formulations have 0% moisture retention. Thus, in addition to the superior shock absorbency, the underlayment of the present invention has superior moisture retention capabilities as compared to the prior art formulations. Furthermore, the underlayment of the present invention more closely simulates the moisture retention of natural grass.

The results reflected by TABLE I also show that air voids within an underlayment do not have any effect on its ability to retain moisture. For example, even though Prior Art "B" has 20% air voids, it still does not retain any moisture after a 24 hour period.

From the above description, it is apparent that the present invention provides an underlayment that provides both excellent shock absorbency and moisture retention properties.

Although the present invention and its advantages have been described in detail, it should be understood that various changes, substitutions and alterations can be made herein without departing from the spirit and scope of the invention as defined by the appended claims.

What is claimed is:

1. A shock absorbing underlayment composition, the composition comprising:

from about 90% to about 85% by weight of butadiene rubber, based on the weight of said composition;

from about 3% to about 1% by weight of an inorganic based moisture-retaining component, based on the weight of said composition, wherein said inorganic based moisture-retaining agent is a hydrated aluminum silicate or volcanic glass; and from about 12% to about 8% by weight of a binder mixture, based on the weight of said composition, said binder mixture comprising from about 10% to about 8% by weight of an isocyanate polyurethane, based on the weight of said composition and from about 1.6% to about 0.2% by weight of an acid, based on the weight of said composition.

2. The composition of claim 1 wherein said composition comprises from about 88% to about 86% by weight of said butadiene rubber, based on the weight of said composition.

3. The composition of claim 1 wherein said composition comprises from about 2% to about 1% by weight of said inorganic-based moisture retaining component, based on the weight of said composition.

4. The composition of claim 1 wherein said composition comprises from about 12% to about 9% by weight of said binder mixture, based on the weight of said composition.

5. The composition of claim 1 wherein said composition comprises about 12% by weight of said binder mixture, based on the weight of said composition.

6. The composition of claim 1 wherein said composition comprises about 86% by weight of said butadiene rubber, based on the weight of said composition.

7. The composition of claim 1 wherein said composition comprises about 2% by weight of said inorganic based moisture-retaining component, based on the weight of said composition.

8. The composition of claim 1 wherein said composition has an open-celled structure.

9. The composition of claim 1 wherein said butadiene rubber is selected from the group consisting of polybutadiene rubber and styrene-butadiene rubber.

10. The composition of claim 9 wherein said butadiene rubber is comprised of granulized polycord tires having a shore "A" ranging from about 40 to about 70.

11. The composition of claim 10 wherein said polycord tires are granulized to a size ranging from about 6 millimeters to about 2 millimeters in diameter.

12. The composition of claim 10 wherein said polycord is selected from the group consisting of nylon and polyester.

13. The composition of claim 10 wherein said shore "A" ranges from about 45 to about 65.

14. The composition of claim 13 wherein said shore "A" ranges from about 50 to about 60.

15. The composition of claim 1 wherein said hydrated aluminum silicate is vermiculite and said volcanic glass is perlite.

16. The composition of claim 1 wherein said isocyanate polyurethane is methylene di-p-phenylene isocyanate polyurethane.

17. The composition of claim 1 wherein said acid is an inorganic acid selected from the group consisting of sulfuric, nitric, hydrochloric and phosphoric.

18. The composition of claim 17 wherein said inorganic acid is an acid mixture of a 20% concentration by weight of sulfuric acid and a 20% concentration by weight of hydrochloric acid in an aqueous medium, wherein said acid mixture has a pH$\leq$3.

19. The composition of claim 18 wherein said acid mixture is comprised of equal amounts of said sulfuric acid and said hydrochloric acid.

20. The composition of claim 1 wherein said composition has a shock absorbency factor from a drop height of 24 inches ranging from about 85 gs to about 90 gs.

21. The composition of claim 1 wherein said composition has a shock absorbency factor from a drop height of 36 inches ranging from about 120 gs to about 125 gs.

22. The composition of claim 1 wherein said composition has a shock absorbency factor from a drop height of 48 inches ranging from about 180 gs to about 200 gs.

23. The composition of claim 1 wherein said composition has a shock absorbency factor from a drop height of 96 inches ranging from about 275 gs to about 300 gs.

24. The process of making a shock absorbing underlayment composition, said process comprising the steps of:

a). mixing thoroughly granulized particles of butadiene rubber in a mixing container, said composition comprising from about 90% to about 85% by weight of said butadiene rubber, based on the weight of said composition;

b). mixing an inorganic-based moisture-retaining component with said butadiene rubber, said composition comprising from about 3% to About 1% by weight of said inorganic based moisture-retaining component, based on the weight of said composition, wherein said inorganic-based moisture-retaining component is a hydrated aluminum silicate or volcanic glass;

c). mixing an acid having a pH$\leq$3 with said butadiene rubber and said inorganic-based moisture-retaining component, said composition comprising from about 1.6% to about 0.2% by weight of said acid, based on the weight of said composition; and d). mixing a isocyanate polyurethane with said butadiene rubber, said inorganic-based moisture-retaining component and said acid, said composition comprising from about 10% to about 8% by weight of isocyanate polyurethane of said composition.

25. A shock absorbing underlayment composition made by the process of claim 24.

26. The process of claim 24 wherein said composition has an open-celled structure.

27. A shock absorbing underlayment composition made by the process of claim 26.

28. The process of claim 24 wherein said butadiene rubber is selected from the group consisting of polybutadiene rubber and styrene-butadiene rubber.

29. A shock absorbing underlayment composition made by the process of claim 28.

30. The process of claim 24 wherein said butadiene rubber is comprised of granulized polycord tires having a shore "A" ranging from about 40 to about 70.

31. The process of claim 30 wherein said polycord is selected from the group consisting of nylon and polyester.

32. The process of claim 30 wherein said polycord tires are granulized to a size ranging from about 6 millimeters to about 2 millimeters in diameter.

33. The process of claim 30 wherein said shore ranges from about 50 to about 60.

34. A shock absorbing underlayment composition made by the process of claim 30.

35. The process of claim 24 wherein said hydrated aluminum silicate is vermiculite and said volcanic glass is perlite.

36. A shock absorbing underlayment composition made by the process of claim 35.

37. The process of claim 24 wherein said isocyanate polyurethane is methylene di-p-phenylene isocyanate polyurethane.

38. A shock absorbing underlayment composition made by the process of claim 37.

39. The process of claim 24 wherein said acid is an inorganic acid selected from the group consisting of sulfuric, nitric, hydrochloric and phosphoric.

40. The process of claim 39 wherein said inorganic acid is an acid mixture of a 20% concentration by weight of sulfuric acid and a 20% concentration by weight of hydrochloric acid in an aqueous medium.

41. A shock absorbing underlayment made by the process of claim 40.

* * * * *

UNITED STATES PATENT AND TRADEMARK OFFICE
CERTIFICATE OF CORRECTION

PATENT NO. : 5,514,722
DATED : May 7, 1996
INVENTOR(S) : Di Geronimo

It is certified that error appears in the above-indentified patent and that said Letters Patent is hereby corrected as shown below:

Col. 1, line 41, "provides" should be --provide--

Col. 2, line 42, delete "of"

Col. 8, lines 15 and 16, delete "of the present" and insert in place thereof --gives the--

On title page, Item [73] "Sports" should read --Sport --.

Signed and Sealed this

Fifteenth Day of October, 1996

Attest:

BRUCE LEHMAN

Attesting Officer      Commissioner of Patents and Trademarks